Patented Oct. 29, 1935

2,019,121

UNITED STATES PATENT OFFICE 2,019,121

NITROGEN INSECTICIDE AND METHOD OF USING SAME

Frank J. De Rewal, Camillus, N. Y., assignor to Atmospheric Nitrogen Corporation, New York, N. Y., a corporation of New York No Drawing. Application July 30, 1931,
Serial No. 554,078

10 Claims. (Cl. 167—22)

My invention relates to insecticides and similar materials adapted to be applied to plants to kill plant destroying life and particularly to insecticides for killing aphids, potato bugs and the like, and to methods of using the same.

Insecticides used for killing insects such as aphids, potato bugs and the like, fall into either one of two general classes, namely: contact insecticides which kill the insec's by contact therewith, and poisons which are applied to the leaves of plants and kill insects by poisoning the same. Lead and arsenic compounds, such as lead arsenate and Paris green which are widely used as insecticides, fall into the latter class and are of slight or no value as contact insecticides. Nicotine and nicotine derivatives are effective as contact insecticides but their cost has inhibited extensive use thereof on a commercial scale.

Among the objects of my invention are to provide a new type of insecticide which possesses the advantages of both contact insecticides and poisons and which is toxic to insects and plant destroying life but which is comparatively safe to handle and apply to plants, to provide a process for producing such insecticide cheaply and easily and to provide a method of killing insects and plant destroying life.

The insecticides to which my invention relates are compounds of the character of organic amines in chemical combination with metallic oxides such as chromic oxide or other poisons, such as lead nitrate or other soluble lead salts, copper sulfate, etc. The organic amines employed in accordance with the present invention are such that they kill insects by contact therewith whereas the inorganic oxide or salt of the insecticide serves as a poison which kills insects which may have escaped contact with the amine compound but which eat the leaves of plants to which the insecticide has been applied. Compounds of the type to which my invention relates have the further advantage that they contain a relatively large amount of nitrogen, which is one of the essential elements for plant life, and that they readily decompose with the liberation of ammonia or ammoniacal compounds.

I prefer to employ hexamethylenetetramine as the organic amine constituent of the insecticides of the present invention. This amine has the property of reacting or combining with numerous inorganic substances such as chromic acid (chromic anhydride) lead nitrate and other soluble lead salts, copper sulfate and the like. Furthermore the nitrogen content of the amine is about 40 per cent and both ammonia and formaldehyde can be readily set free from the same. Hexamethylenetetramine itself is highly toxic to plants and is only feebly active as an insecticide, that is the amount of formaldehyde liberated thereby is very small. However the additive compounds of hexamethylenetetramine to which my invention relates are much less toxic to plants and are much more reactive than hexamethylenetetramine, possessing the property of liberating formaldehyde in sufficient amount to serve as an active insecticide but in insufficient amount to destroy the plants to which they are applied. The hexamethylenetetramine-lead nitrate compound is similar to the chromic acid compound in that it is more reactive than hexamethylenetetramine itself and serves as a valuable insecticide.

As an example of the type of insecticides to which my invention relates and methods of producing the same, the following description of a preferred method of producing chrome-hexa-methylenetetramine is cited.

*Example.*—70 parts of strong aqua ammonia containing about 29.0 per cent of $NH_3$ are slowly added to 100 parts of a 40 per cent solution of formaldehyde. The reaction mixture is allowed to stand for some time and an additional 10 parts of aqua ammonia are added to the mixture. The mixture thus obtained is allowed to cool to room temperature and an aqueous solution of chromic acid is added. Good yields of the chrome-hexamethylenetetramine compound are obtained by allowing the chromic acid and the hexamethylenetetramine to remain together for several minutes before separating the precipitate. The resulting precipitate is dried immediately, preferably at a temperature below 100° C. On analysis the product contains 26.5% of nitrogen and 16.3% of chromium indicating that the formula of the product probably is $3(CH_2)_6N_4.2CrO_3$. The reactions which take place in producing the insecticide may be represented by the following equations:

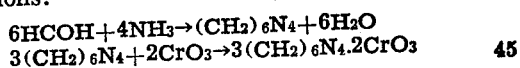

$$6HCOH + 4NH_3 \rightarrow (CH_2)_6N_4 + 6H_2O$$
$$3(CH_2)_6N_4 + 2CrO_3 \rightarrow 3(CH_2)_6N_4.2CrO_3$$

The product when freshly precipitated is light-yellow in color, changing slowly to a dirty brown with partial decomposition on standing. When exposed to the air for long periods of time, a brown crust forms on the surface of the product, but when the crust is scraped off the light-yellow color of the freshly precipitated product is again exposed. The dry material is yellow in color when dried very slowly, or is brown if the drying temperature exceeds about 100° or 110° C. The apparent density of the product is 1.0 to 1.1 gr. per c. c. If the dry powder is heated there is first an evolution of formaldehyde followed at a somewhat higher temperature by an ammoniacal gas, probably methylamine. The final residue is green chromic oxide.

The dry powder dissolves slowly in water imparting a characteristic chromate ion color to the solution and formaldehyde is easily detected in this solution. A solution containing one-half of 1 percent of the chrome-hexamethylenetetramine compound may be applied as a spray or otherwise to plants and in practice it is found that this concentration is comparable in effect to Paris green in killing aphids, potato bugs, etc. When applied as a 1 percent solution to beans, peas, corn, tomatoes, cucumbers, beets, lettuce, carrots, and lima beans, the plants show no indication of ill effects. It is thus apparent that the insecticide possesses the requisite toxicity to insects to destroy the same while the plants to which the insecticide is applied are uninjured. The solution on drying leaves a thin film on the plant which serves as a poison, thus ensuring destruction of insects which have not been killed by contact with the insecticide. The insecticide thus serves the purpose of both contact insecticides and poisons.

The insecticides of the present invention may, of course, be applied to trees as well as plants and may be used in dry powdered form in admixture with an inert diluent such as ground limestone or silica, precipitated calcium carbonate or chalk, barium carbonate, etc. instead of in solution as described above.

While I have described my invention with particular reference to the chrome-hexamethylenetetramine compound, it will be apparent that other poisonous metallic oxides and poisonous salt compounds of hexamethylenetetramine may be produced and the chromium salts of amines other than hexamethylenetetramine may be used as insecticides in accordance with my invention without departing from the spirit or scope thereof. It is also apparent that other methods of producing the compounds may be employed and hexamethylenetetramine from other sources such as that purchased in the open market may be used in producing the insecticides.

I claim:

1. An insecticide comprising a chemical compound of hexamethylenetetramine with a metal toxic to insect life.

2. An insecticide comprising a chemical compound of hexamethylenetetramine with a metal from the group consisting of chromium, lead and copper.

3. An insecticide comprising chrome hexamethylenetetramine.

4. An insecticide comprising a chemical compound of hexamethylenetetramine with a soluble lead salt.

5. An insecticide comprising a chemical compound of hexamethylenetetramine with lead nitrate.

6. The method of killing plant-destroying insect life which comprises applying to plants infested with said insect life a chemical compound of hexamethylenetetramine with a metal toxic to insect life.

7. The method of killing plant-destroying insect life which comprises applying to plants infested with said insect life a chemical compound of hexamethylenetetramine with a metal from the group consisting of chromium, lead and copper.

8. The method of killing plant-destroying insect life which comprises applying to plants infested with said insect life a chemical compound of chrome hexamethylenetetramine.

9. The method of killing plant-destroying insect life which comprises applying to plants infested with said insect life a chemical compound of hexamethylenetetramine with a soluble lead salt.

10. The method of killing plant-destroying insect life which comprises applying to plants infested with said insect life a chemical compound of hexamethylenetetramine with lead nitrate.

FRANK J. DE REWAL.